US008256382B2

(12) United States Patent
Ba-abbad (10) Patent No.: US 8,256,382 B2
(45) Date of Patent: Sep. 4, 2012

(54) METHOD AND SYSTEM FOR MANAGING ANIMAL WASTE IN AN ANIMAL BREEDING FARM

(75) Inventor: Mazen A. Ba-abbad, Riyadh (SA)

(73) Assignee: King Abdul Aziz City for Science and Technology (KACST), Riyadh (SA)

( * ) Notice: Subject to any disclaimer, the term of this patent is extended or adjusted under 35 U.S.C. 154(b) by 195 days.

(21) Appl. No.: 12/870,785

(22) Filed: Aug. 27, 2010

(65) Prior Publication Data

US 2012/0047803 A1   Mar. 1, 2012

(51) Int. Cl.
*A01K 1/01* (2006.01)
*A01G 31/00* (2006.01)

(52) U.S. Cl. ........................................ 119/450; 47/62 A
(58) Field of Classification Search ................. 119/450, 119/174; 47/62 A, 62 N, 62 R, 59 S
See application file for complete search history.

(56) References Cited

U.S. PATENT DOCUMENTS

| 3,802,390 | A | * | 4/1974 | Blair et al. | 119/450 |
|---|---|---|---|---|---|
| 4,060,054 | A | * | 11/1977 | Blair | 119/447 |
| 4,200,059 | A | * | 4/1980 | Frick et al. | 119/420 |
| 4,332,105 | A | * | 6/1982 | Nir | 47/1.01 R |
| 5,247,901 | A | * | 9/1993 | Landon et al. | 119/419 |
| 5,865,141 | A | * | 2/1999 | Poynter et al. | 119/246 |
| 6,308,660 | B1 | * | 10/2001 | Coiro et al. | 119/419 |
| 7,192,523 | B2 | * | 3/2007 | Perriello | 210/610 |
| 7,811,352 | B2 | * | 10/2010 | Binder et al. | 71/6 |
| 2009/0038552 | A1 | * | 2/2009 | Baker et al. | 119/14.03 |

* cited by examiner

*Primary Examiner* — Yvonne Abbott
(74) *Attorney, Agent, or Firm* — Timberline Patent Law Group PLLC (57) ABSTRACT

The invention provides a method and system for managing animal waste produced in an animal breeding farm. The animal breeding farm is sealed from external atmosphere. The method includes collecting the animal waste from a plurality of animals in the animal breeding farm. The animal waste is then processed for obtaining fertilizers. The processing of the animal waste includes chemical treatment, thermal treatment, and aerobic digestion of the animal waste. The method further includes utilizing the fertilizers for growing a plurality of plants in one or more aeroponic units.

21 Claims, 7 Drawing Sheets

METHOD AND SYSTEM FOR MANAGING ANIMAL WASTE IN AN ANIMAL BREEDING FARM

FIELD OF THE INVENTION

The present invention generally relates to managing animal waste in an animal breeding farm, and more specifically, to a method and system for efficiently removing animal waste from an animal breeding farm sealed from external atmosphere, for processing the animal waste and utilizing the processed animal waste as fertilizers in one or more aeroponic units.

BACKGROUND OF THE INVENTION

Animal breeding farms are typical sources of large quantities of organic waste including animal waste, slaughter remains, exhale gases, and odor that contaminate the environment. As a result, such animal breeding farms are usually located away from residential areas. The animal waste, slaughter remains, exhale gases, and odor produced from animal breeding farms may spread through air, water or by farm animals and farm workers. Further, the animal waste also contains viruses, bacteria, protozoa, and helminthes that when transmitted to humans can adversely impact human health. Thus, such animal breeding farms may need to be upgraded, modified, or supplemented with a treatment process for processing the organic waste. By processing the organic waste, the air quality in and around such animal breeding farms can be improved thereby protecting the environment, and human and animal health.

In animal breeding farms, farm animals such as, cows, sheep, pigs, chicken, turkeys, geese, and ducks are kept in close vicinity to each other in the animal breeding farms and are not properly isolated. Such high density living conditions potentially cause disease transmission within the animal breeding farms, resulting in a disease outbreak. If such animal breeding farms are not properly isolated and treated, then the disease may spread to other animal breeding farms and to human beings through air and water.

In order to reduce any hazards caused due to production of odor from animal waste, air conditioning may be used within animal breeding farms. Further, open air circulation and water spray cooling systems are also utilized for controlling odor produced in the animal breeding farms. However, this requires large amounts of water that may not be easily available at all the places in abundance. Further, costs involved in running air conditioning units is high.

Notwithstanding the problems and detrimental effects of the disposal of untreated organic waste mentioned above, proper management of the organic waste produced from animal breeding farms acts as a good nutritional source for plants. However, the existing technologies do not utilize the organic waste as a nutritional source for plants in an efficient manner while effectively reducing the problems caused due to the organic waste in the animal breeding farms.

Therefore, there is a need for a method and system to provide a sealed and an isolated environment for farm animals while efficiently processing the waste material and odor that is produced from the farm animals and reduce maintenance costs in animal breeding farms.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and apparatus components related to method and system for managing animal waste in an animal breeding farm. Accordingly, the apparatus components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Various embodiments of the invention provide methods and system for managing animal waste produced in an animal breeding farm. The animal breeding farm is sealed from external atmosphere. The method includes collecting the animal waste from a plurality of animals in the animal breeding farm. The animal waste is then processed for obtaining fertilizers. The processing of the animal waste includes chemical treatment, thermal treatment, and aerobic digestion of the animal waste. The method further includes utilizing the fertilizers for growing a plurality of plants in one or more aeroponic units.

Figure 1:
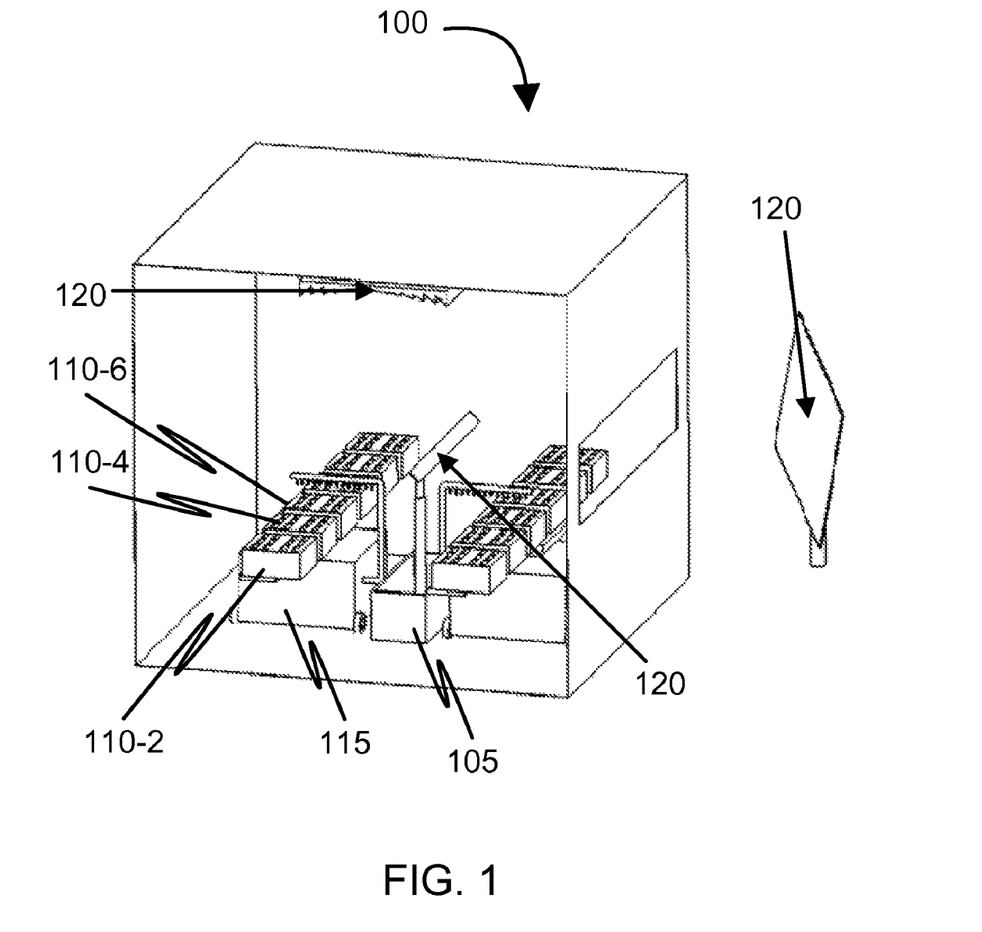
FIG. 1 illustrates an animal breeding farm housing a plurality of animals in accordance with an embodiment of the invention.

FIG. 1 illustrates an animal breeding farm 100 housing a plurality of animals in accordance with an embodiment of the invention. Animal breeding farm 100 is sealed from an external atmosphere. Animal breeding farm 100 includes a plurality of animal breeding units such as, an animal breeding unit 105. In an embodiment, the plurality of animal breeding units in animal breeding farm 100 may be arranged horizontally, vertically, or randomly positioned within animal breeding farm 100. For example, the one or more animal breeding units are arranged in an open corridor arrangement. However, it would be apparent to a person having ordinary skilled in the art that the one or more animal breeding units may be arranged in any fashion within animal breeding farm 100.

Each animal breeding unit of the plurality of animal breeding units includes one or more animals of the plurality of animals. Examples of animals housed in animal breeding farm 100 includes, but is not limited to, cows, sheep, pigs, chicken, turkeys, geese, and ducks. The odors produced by the animals housed in animal breeding farm 100 are minimized as animal breeding farm 100 is a sealed environment.

Animal breeding farm 100 includes a plurality of waste collection units (not shown in FIG. 1). A waste collection unit of the plurality of waste collection units collects animal waste from one or more animals housed in the one or more animal breeding units. The animal waste may include animal excreta, slaughter remains, and gases produced by the plurality of animals. The plurality of waste collection units collects animal excreta and slaughter remains. In order to collect the animal waste, the plurality of waste collection units is adaptively coupled to the plurality of animal breeding units. In an embodiment, the plurality of waste collection units is moveably coupled to one or more rails (not shown in FIG. 1). The one or more rails are held by one or more rail holders. The plurality of waste collection units collects and transports the animal waste from one place to another on the one or more rails. In another embodiment, a waste collection unit of the plurality of waste collection units may be moved for performing maintenance and servicing operations from one place to another on the one or more rails.

Additionally, in order to collect the gases produced by the plurality of animals, animal breeding farm 100 includes a first exhaust unit (not shown in FIG. 1), adaptively coupled to the plurality of animal breeding units. The gases produced by the plurality of animals include, but are not limited to, nitrogen, carbon dioxide, ammonia, and sulfur dioxide. The first exhaust unit is configured to remove the gases produced by the plurality of animals from the plurality of animal breeding units. Thus, the removal of the animal waste by the plurality of waste collection units and the first exhaust unit provides hygienic conditions for the plurality of animals in the plurality of animal breeding units. Further, as the animal waste is removed from the plurality of animal breeding units, the plurality of animals is not exposed to any kind of contamination that may arise due to the presence of the animal waste in the one or more animal breeding units.

The animal waste such as, the animal excreta and the slaughter remains may be processed to obtain fertilizers. To this end, animal breeding farm 100 includes a processing unit (not shown in FIG. 1) for processing the animal waste to obtain fertilizers. The processing unit is adaptively coupled to the plurality of waste collection units for receiving the animal waste from the plurality of waste collection units. The processing unit includes a chemical treatment unit, a thermal treatment unit, and a biological digester. The chemical treatment unit chemically treats the animal waste. The chemical treatment of the animal waste includes addition of one or more chemicals in predefined proportions to the animal waste. It will be apparent to a person skilled in the art that the animal waste may be chemically treated using any of the chemical treatment processes known in the art.

Subsequent to the chemical treatment, the animal waste is treated in the thermal treatment unit. In an embodiment, the thermal treatment unit utilizes solar energy for thermally treating the animal waste. The thermal treatment of the animal waste may result in production of one or more gases. For example, methane is produced in case the animal waste is incompletely burnt in the thermal treatment unit. Therefore, in an embodiment, the thermal treatment unit is configured to convert methane produced into carbon dioxide. The methane produced may be periodically vented out from animal breeding farm 100 through a vent provided at a ceiling of animal breeding farm 100.

Thereafter, the biological digester processes the animal waste by aerobically digesting the animal waste. In this embodiment, the animal waste is processed sequentially by the chemical treatment unit, the thermal treatment unit, and the biological digester. However, it would be apparent to a person having ordinary skill in the art that the animal waste may be processed in any order in order to obtain the fertilizers.

The fertilizers obtained from the animal waste may be used by plants within animal breading farm 100. Animal breeding farm 100 further includes one or more aeroponic units housing a plurality of plants. The one or more aeroponic units, such as, an aeroponic unit 110-2, an aeroponic unit 110-4, and an aeroponic unit 110-6, are utilized for growing the plurality of plants. Each of the one or more aeroponic units includes one or more trays, a plurality of mobile tanks, and a plurality of aeroponic sprayers adaptively connected to the plurality of mobile tanks. In an embodiment, the one or more aeroponic units are arranged within animal breeding farm 100 in a shelf type plant pot arrangement discussed in detail with conjunction to FIG. 3. However, it would be apparent to a person having ordinary skill in the art that the one or more aeroponic units may be arranged in any fashion within animal breeding farm 100. The one or more aeroponic units are configured to receive the fertilizers from the processing unit. Further, each aeroponic unit includes a plurality of mobile tanks for storing the fertilizers. The plurality of mobile tanks, such as for example, a mobile tank 115 receives the fertilizers from the processing unit. Additionally, the plurality of mobile tanks may also store water and a set of chemicals.

The plurality of plants housed in the one or more aeroponic units may require one or more gases such as, carbon dioxide. In an embodiment, a plant of the plurality of plants is a photosynthesis organism consuming carbon dioxide and light energy during photosynthesis to produce oxygen. Thus, the one or more aeroponic units may be adaptively coupled with the first exhaust unit that delivers the one or more gases such as, carbon dioxide produced by the plurality of animals to the plurality of plants. In alternate embodiments, the one or more aeroponic units may receive carbon dioxide from other sources including, but not limited to, mushroom breeding units, fermentation units, exhausts, etc. The carbon dioxide delivered by the first exhaust unit facilitates the photosynthesis by the plurality of plants grown in the one or more aeroponic units. The one or more aeroponic units are explained in detail in conjunction with FIG. 3.

In addition to carbon dioxide, the plurality of plants requires light energy, such as solar energy during photosynthesis. Thus, animal breeding farm 100 includes a Fresnel mirror arrangement 120 in order to provide the light energy required during the photosynthesis. Fresnel mirror arrangement 120 includes a flat mirror reflecting unit and a Fresnel mirror unit, for directing light energy of the sun into animal breeding farm 100. Fresnel mirror arrangement 120 is configured to supply solar energy to the one or more animal breeding units of the plurality of animal breeding units, the processing unit, and the one or more aeroponic units. The usage of Fresnel mirror arrangement 120 enables providing controlled solar lighting for the one or more animal breeding units of the plurality of animal breeding units, the processing unit, and the one or more aeroponic units. Fresnel mirror arrangement 120 is explained in detail in conjunction with FIG. 2.

The plurality of plants in the one or more aeroponic units produces one or more gases, such as oxygen during photosynthesis. In order to remove the one or more gases, animal breeding farm 100 further includes a second exhaust unit (not shown in FIG. 1) adaptively coupled to the one or more aeroponic units. The second exhaust unit is configured to remove one or more gases produced by the plurality of plants grown in the one or more aeroponic units. Further, the second exhaust unit is adaptively coupled to the plurality of animal breeding units for delivering the one or more gases produced by the plurality of plants to the plurality of animal breeding units. The odors produced in the plurality of animal breeding units due to gases such as, ammonia and sulfur dioxide are minimized because these gases are absorbed by the plurality of plants. Therefore, animal breeding farm 100 functions as a self sustained system managing the animal waste by utilizing the one or more aeroponic units integrated with the plurality of animal breeding units. It would be readily apparent to a person having ordinary skill in the art that animal breeding farm 100 may include any number of aeroponic units integrated with any number of animal breeding units to provide sufficient amount of nutrients and gases to the animals and the plants thereby providing a self sustained environment.

Furthermore, in order to supplement the light energy provided by Fresnel mirror arrangement 120, animal breeding farm 100 includes an environment maintenance unit (not shown in FIG. 1) with a light source. The light source may include, but not limited to, an electrically powered light source, a fuel-cell powered light source, a fuel powered light source, a solar-battery powered light source, etc. The environment maintenance unit also includes a temperature controller configured to control and regulate temperature within animal breeding farm 100. The temperature that needs to be maintained within animal breeding farm 100 is harmonized among the plurality of plants grown in the one or more aeroponic units and the plurality of animals housed in animal breeding farm 100. However, since animal breeding farm 100 is sealed from the external environment, the need to control and regulate temperature of air within animal breeding farm 100 is minimized. Further, animal breeding farm 100 may be easily isolated and cleaned in an event of a disease outbreak. For example, in case of a disease breakout, animal breeding farm 100 may be isolated for facilitating easy cleaning of animal breeding farm 100 and for treating the plurality of animals in animal breeding farm 100.

The environment maintenance unit also includes a humidity controller configured to control humidity of the air within animal breeding farm 100. Additionally, in an embodiment, a gas level controller may also be provided in the environment maintenance unit. The gas level controller maintains the oxygen and carbon dioxide levels within animal breeding farm 100. Further, the gas level controller may also provide supplementary oxygen and carbon dioxide required for the plurality of plants grown in the one or more aeroponic units and the plurality of animals housed in animal breeding farm 100.

Figure 2:
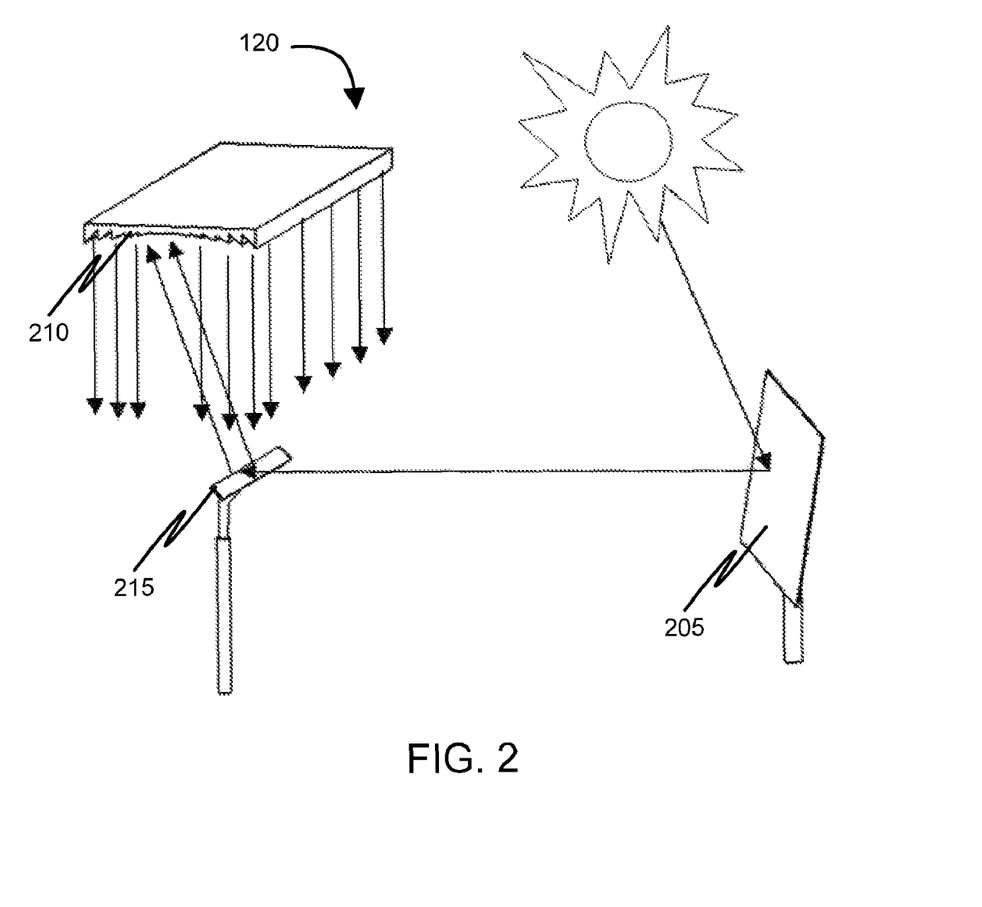
FIG. 2 illustrates a Fresnel mirror arrangement in accordance with an embodiment of the invention.

FIG. 2 illustrates Fresnel mirror arrangement 120 in accordance with an embodiment of the invention. Fresnel mirror arrangement 120 is configured to supply solar energy to the one or more animal breeding units of the plurality of animal breeding units, the processing unit, and the one or more aeroponic units in animal breeding farm 100. Fresnel mirror arrangement 120 includes a flat mirror reflecting unit 205 and a Fresnel mirror unit 210. Flat mirror reflecting unit 205 is configured to rotate around a dual axis of flat mirror reflecting unit 205 for receiving sunlight. Flat mirror reflecting unit 205 may be located outside animal breeding farm 100 which is sealed from the external environment. Flat mirror reflecting unit 205 reflects the sunlight in response to receiving the sunlight. In an embodiment, flat mirror reflecting unit 205 tracks the position of the sun and reflects the sunlight directly to center of Fresnel mirror unit 210 located at the ceiling of animal breeding farm 100. The sunlight is reflected directly to Fresnel mirror unit 210 through a variable opening window provided on a wall of animal breeding farm 100. Fresnel mirror arrangement 120 includes a light reflecting and diffusing system (not shown in FIG. 2) to control intensity of sunlight allowed into animal breeding farm 100, thereby curbing solar irradiation.

In another embodiment, flat mirror reflecting unit 205 tracks the position of the sun and reflects the sunlight to a fixed flat mirror 215, located within animal breeding farm 100. The sunlight is reflected to fixed flat mirror 215 through the variable opening window. Fixed flat mirror 215 may be tilted at an angle of 45° to reflect the sunlight to center of Fresnel mirror unit 210. Subsequently, Fresnel mirror unit 210 reflects the sunlight to the one or more animal breeding units of the plurality of animal breeding units, the processing unit, and the one or more aeroponic units in a distributed manner. As explained in FIG. 1, supplementary light energy may be provided to animal breeding farm 100 using the light source in the environment maintenance unit.

Figure 3:
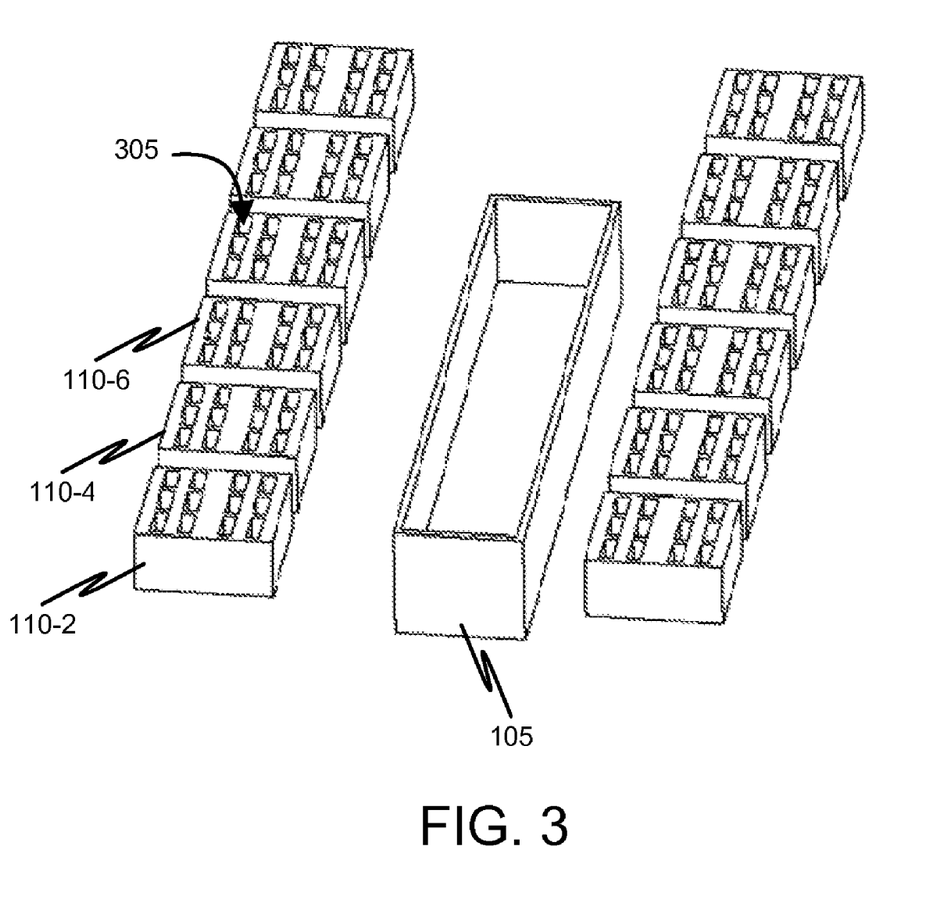
FIG. 3 illustrates an aeroponic unit of one or more aeroponic units in accordance with an embodiment of the invention.

FIG. 3 illustrates the one or more aeroponic units in accordance with an embodiment of the invention. An aeroponic unit, such as aeroponic unit 110-2 is configured to receive fertilizers from the processing unit for growing the plurality of plants. Aeroponic unit 110-2 includes the one or more trays, each tray having one or more openings such as, an opening 305. A plant of a plurality of plants in aeroponic unit 110-2 is held in an opening. The plant's root portion is held below the opening, while the plant's stem portion is held above the opening. Aeroponic unit 110-2 also includes the plurality of mobile tanks for storing the fertilizers received from the processing unit, water, and a set of chemicals. Furthermore, aeroponic unit 110-2 includes the plurality of aeroponic sprayers (not shown in FIG. 3) adaptively connected to the plurality of mobile tanks. An aeroponic sprayer of the plurality of aeroponic sprayers is configured to spray a solution to root portions of the plurality of plants. The solution is obtained by mixing the fertilizers with a predefined amount of water, and one or more chemicals of the set of chemicals stored in the plurality of mobile tanks Mobile tank 115 of the plurality of mobile tanks is explained in detail in conjunction with FIG. 4.

Figure 4:
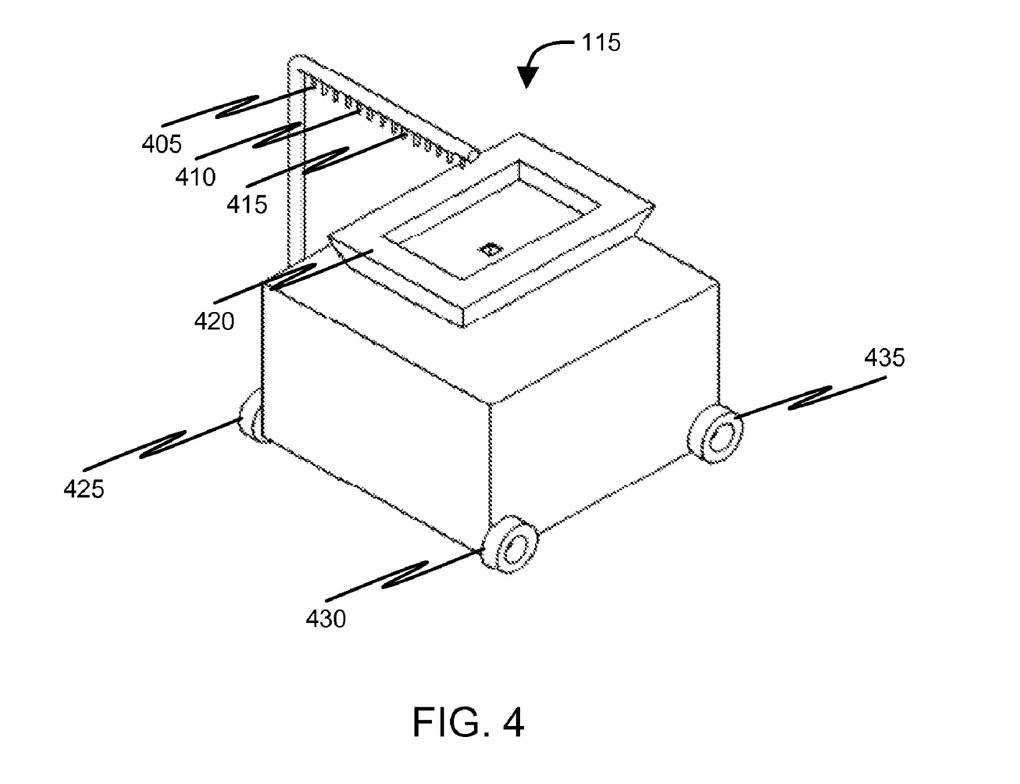
FIG. 4 illustrates a mobile tank of a plurality of mobile tanks in accordance with an embodiment of the invention.

FIG. 4 illustrates mobile tank 115 of the plurality of mobile tanks in accordance with an embodiment of the invention. As explained in FIG. 3, a plurality of aeroponic sprayers is adaptively connected to the plurality of mobile tanks Mobile tank 115 stores the fertilizers received from the processing unit, the water, and the set of chemicals. The fertilizers, water and one or more chemicals of the set of chemicals are mixed together to form a solution that needs to be supplied to the plurality of plants. For supplying the solution, a plurality of aeroponic sprayers for example, an aeroponic sprayer 405, an aeroponic sprayer 410, and an aeroponic sprayer 415 are used. The plurality of aeroponic sprayers are adaptively connected to mobile tank 115. Aeroponic sprayer 405, aeroponic sprayer 410, and aeroponic sprayer 415 are configured to spray the solution to the root portions of the plurality of plants. The plurality of plants in the one or more aeroponic units receives the nutrients required for their growth. Further, spraying the solution to the root portions of the plurality of plants provides a cooling effect within animal breeding farm 100.

The solution sprayed on the root portions of the plant may drop down from the root portions. Mobile tank 115 includes a plurality of solution collection units, such as, a solution collection unit 420. Solution collection unit 420 of the plurality of solution collection units is configured to collect a portion of the solution dropped from the root portions of the plurality of plants. The plurality of solution collection units is adaptively coupled to the plurality of mobile tanks for delivering the portion of the solution dropped from the root portions of the plurality of plants to the plurality of mobile tanks In an embodiment, mobile tank 115 may include a solution storage unit for storing the collected portion of the solution. Upon collecting the portion of the solution, the solution is reused for spraying the solution to the root portions of the plurality of plants.

In an embodiment, mobile tank 115 comprises a plurality of wheels, such as a wheel 425, a wheel 430, and a wheel 435. Mobile tank 115 is moveably coupled to one or more rails (not shown in FIG. 4). The one or more rails are held by one or more rail holders. The plurality of mobile tanks may move from one place to another on the one or more rails for transporting the fertilizers, the water, and the set of chemicals. In this embodiment, mobile tank 115 moves on the plurality of wheels in a straight line for providing water to the plurality of plants grown in the one or more aeroponic units. In another embodiment, the plurality of mobile tanks may move from one place to another using the plurality of wheels without being moveably coupled to the one or more rails.

Figure 5:
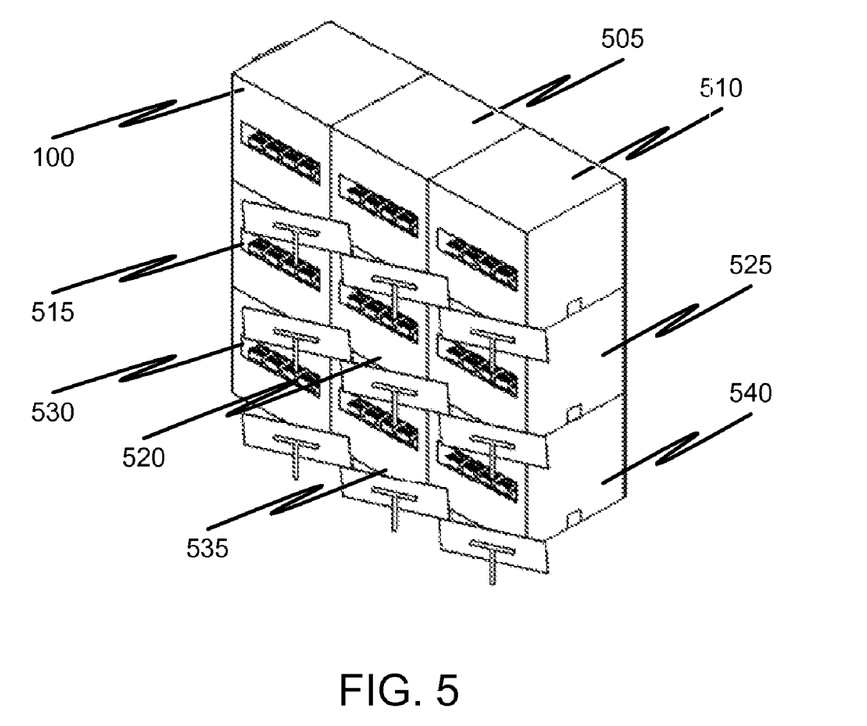
FIG. 5 shows a stacked arrangement of multiple animal breeding farms in accordance with an embodiment of the invention.

Moving now to FIG. 5, a stacked arrangement of multiple animal breeding farms is shown in accordance with an embodiment of the invention. For example, animal breeding farm 100 is stacked alongside other animal breeding farms, such as an animal breeding farm 505, an animal breeding farm 510, an animal breeding farm 515, an animal breeding farm 520, an animal breeding farm 525, an animal breeding farm 530, an animal breeding farm 535, and an animal breeding farm 540. It will be apparent to a person skilled in the art that the plurality of animal breeding farms may be arranged in any other manner.

Figure 6:
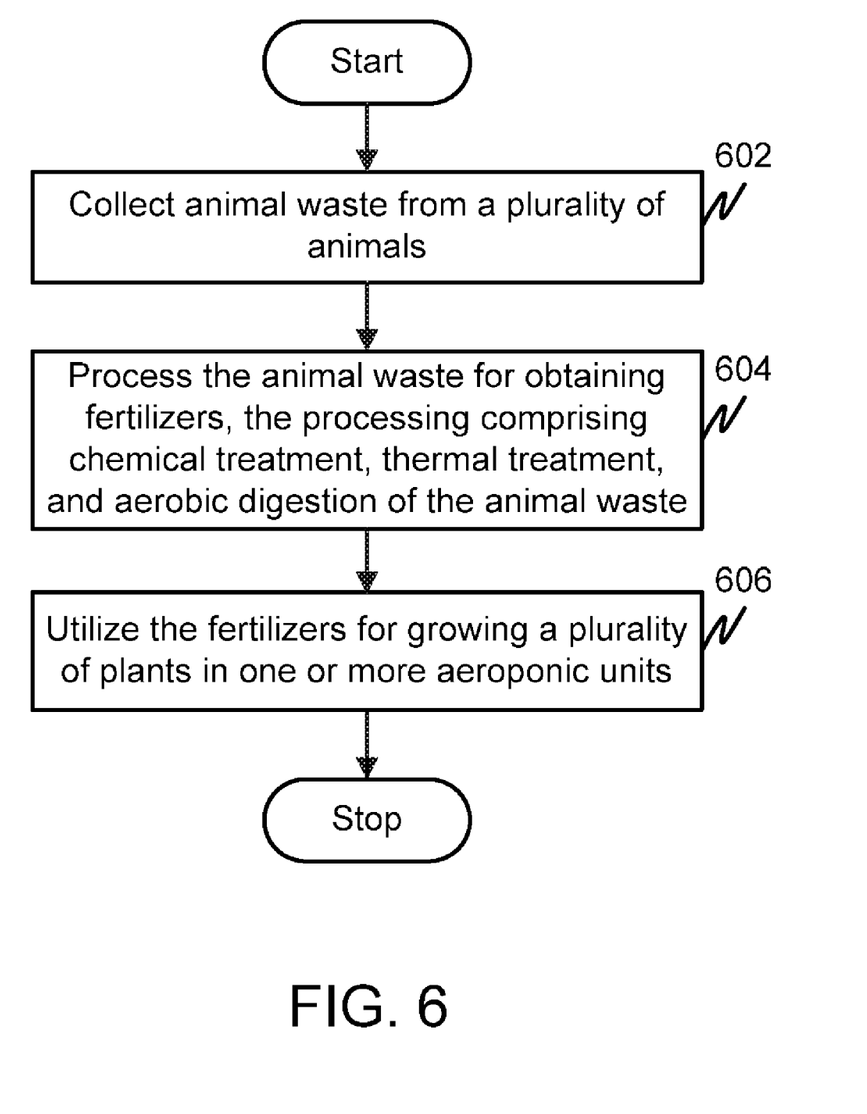
FIG. 6 is a flowchart of a method of managing animal waste in the animal breeding farm in accordance with an embodiment of the invention.

FIG. 6 is a flowchart of a method of managing animal waste in an animal breeding farm in accordance with an embodiment of the invention. The animal breeding farm is sealed from external atmosphere. The animal breeding farm houses a plurality of animals in a plurality of animal breeding units. At step 602, the animal waste is collected from the plurality of animals housed in the plurality of animal breeding units. The animal waste includes animal excreta, slaughter remains, and gases produced by the plurality of animals. The animal waste is collected from the plurality of animals using a plurality of waste collection units and a first exhaust unit. The plurality of waste collection units collects animal excreta and slaughter remains. The gases produced by the plurality of animals are collected by a first exhaust unit. The collection of the animal waste has been explained in detail in conjunction with FIG. 1. After collecting the animal waste from the plurality of animals, at step 604, the animal waste is processed in order to obtain fertilizers. Therefore, the animal waste produced in the plurality of animal breeding units is processed to derive nutrients for the plurality of plants. The processing of the animal waste includes chemical treatment, thermal treatment, and aerobic digestion of the animal waste. The processing of the animal waste has been explained in detail in conjunction with FIG. 1.

Thereafter, at step 606, the fertilizers obtained by processing the animal waste are utilized for growing a plurality of plants in one or more aeroponic units. An aeroponic unit of the one or more aeroponic units has been explained in FIG. 3. The utilization of the fertilizers for growing a plurality of plants in one or more aeroponic units is further explained in conjunction with FIG. 7. The plurality of plants housed in the one or more aeroponic units may require one or more gases such as, carbon dioxide. In an embodiment, a plant of the plurality of plants is a photosynthesis organism consuming carbon dioxide and light energy during photosynthesis to produce oxygen. Thus, the one or more aeroponic units may be adaptively coupled with the first exhaust unit that delivers the one or more gases such as, carbon dioxide produced by the plurality of animals. Further, in order to provide the light energy required during photosynthesis, the animal breeding farm includes a Fresnel mirror arrangement. The Fresnel mirror arrangement has been explained further in FIG. 2. Further, the atmosphere in the animal breeding farm may be maintained by controlling temperature of air, controlling humidity of air, and providing supplementary light energy.

Figure 7:
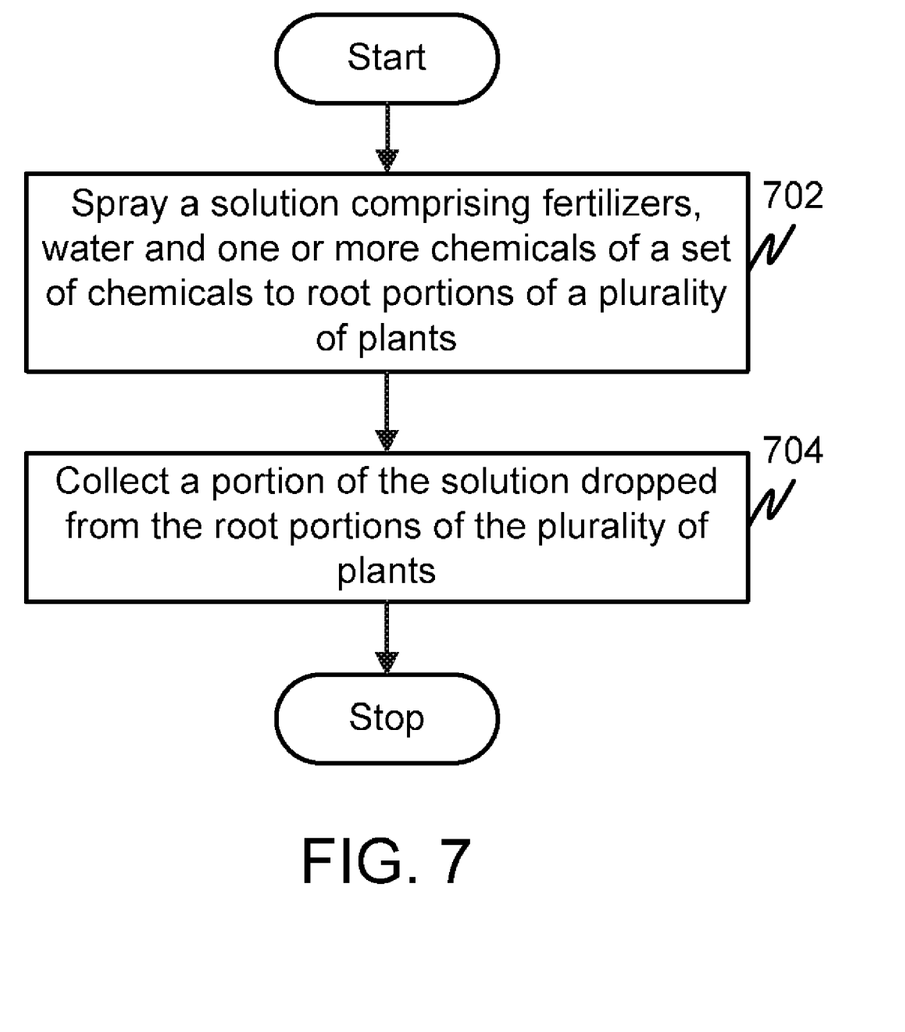
FIG. 7 is a flowchart of a method for utilizing fertilizers for growing a plurality of plants in the one or more aeroponic units in accordance with an embodiment of the invention.

FIG. 7 is a flowchart of a method for utilizing fertilizers for growing a plurality of plants in the one or more aeroponic units in accordance with an embodiment of the invention. The fertilizers are mixed with a predefined amount of water, and one or more chemicals of a set of chemicals stored in the plurality of mobile tanks to form a solution. At step 702, the solution comprising the fertilizers, the water and the one or more chemicals is sprayed to the root portions of the plurality of plants. The spraying of the solution to the root portions of the plurality of plants has been explained further in FIG. 4. Thereafter, at step 704, a portion of the solution dropped from the root portions of the plurality of plants is collected. For example, the portion of the solution may be collected using a plurality of solution collection units in the mobile tank of the plurality of mobile tanks. The portion of the solution dropped from the root portions of the plurality of plants is then delivered to the plurality of mobile tanks. The collected portion of the solution may be reused for spraying the solution to the root portions of the plurality of plants.

Various embodiments of the invention provide methods and systems for managing animal waste in an animal breeding farm housing a plurality of animals. The animal breeding farm is sealed from external atmosphere. Since the animal breeding farm is sealed from the external environment, the need to control and regulate temperature of air within the animal breeding farm is minimized. Further, the animal breeding farm may easily be isolated and cleaned in an event of a disease outbreak. The animal waste is collected from the plurality of animals and processed for obtaining fertilizers. The fertilizers are mixed with a predefined amount of water and one or more chemicals of a set of chemicals to form a solution. The solution is then sprayed to root portions of a plurality of plants in one or more aeroponic units. Spraying the solution to the root portions of the plurality of plants provides a cooling effect within the animal breeding farm.

In an embodiment, a plant of the plurality of plants is a photosynthesis organism consuming carbon dioxide and light energy during photosynthesis to produce oxygen. Gases produced by the plurality of animals in a plurality of animal breeding units, such as carbon dioxide, is removed and delivered to the plurality of plants in the one or more aeroponic units. Similarly, gases produced by the plurality of plants in the one or more aeroponic units, such as carbon dioxide, is removed and delivered to the plurality of animal breeding units. Therefore, the animal breeding farm functions as a self sustained system managing the animal waste by utilizing the one or more aeroponic units integrated with the plurality of animal breeding units.

Further, the animal breeding farm utilizes a Fresnel mirror arrangement in order to provide the light energy required during the photosynthesis. The Fresnel mirror arrangement includes a light reflecting and diffusing system to control intensity of sunlight allowed into the animal breeding farm, thereby curbing solar irradiation. Additionally, the odors produced due to the plurality of animal breeding units are minimized as gases such as ammonia and sulfur dioxide are absorbed by the plurality of plants in the one or more aeroponic units.

Those skilled in the art will realize that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A system for managing animal waste in an animal breeding farm, the animal breeding farm comprising a plurality of animals, the animal breeding farm being sealed from external atmosphere, the system comprising:
    a plurality of animal breeding units, wherein an animal breeding unit houses at least one animal of the plurality of animals;
    a plurality of waste collection units, the plurality of waste collection units being adaptively coupled to the plurality of animal breeding units, wherein a waste collection unit collects animal waste from at least one animal breeding unit;
    a processing unit for processing the animal waste for obtaining fertilizers, the processing unit being adaptively coupled to the plurality of waste collection units for receiving the animal waste; and
    at least one aeroponic unit, an aeroponic unit of the at least one aeroponic unit is configured for receiving fertilizers from the processing unit for growing a plurality of plants.

2. The system of claim 1 further comprising a Fresnel mirror arrangement, the Fresnel mirror arrangement configured to supply solar energy to at least one of the plurality of animal breeding units, the processing unit, and the at least one aeroponic unit, wherein the Fresnel mirror arrangement comprises:
    a flat mirror reflecting unit, the flat mirror reflecting unit being configured to rotate around a dual axis of the flat mirror reflecting unit for receiving sunlight, wherein the flat mirror reflecting unit reflects the sunlight in response to receiving the sunlight; and
    a Fresnel mirror unit located at a ceiling of the animal breeding farm, the Fresnel mirror unit being positioned to receive the sunlight reflected by the flat mirror reflecting unit, wherein the Fresnel mirror unit reflects the sunlight to at least one of the plurality of animal breeding units, the processing unit and the at least one aeroponic unit.

3. The system of claim 1, wherein an aeroponic unit of the at least one aeroponic unit comprises:
    at least one tray, a tray having at least one opening, wherein each opening holds a plant of the plurality of plants in the aeroponic unit;
    a plurality of mobile tanks for storing at least one of the fertilizers received from the processing unit, water and a set of chemicals; and
    a plurality of aeroponic sprayers adaptively connected to the plurality of mobile tanks, wherein an aeroponic sprayer is configured to spray a solution to root portions of the plurality of plants, wherein the solution comprises the fertilizers, water and at least one chemicals of the set of chemicals obtained from the plurality of mobile tanks.

4. The system of claim 3, wherein an aeroponic unit of the at least one aeroponic unit further comprises a plurality of solution collection units, a solution collection unit is configured to collect a portion of the solution dropped from the root portions of the plurality of plants.

5. The system of claim 4, wherein the plurality of solution collection units is adaptively coupled to the plurality of mobile tanks for delivering the solution dropped from the root portions of the plurality of plants.

6. The system of claim 3, wherein a mobile tank of the plurality of mobile tanks comprises a plurality of wheels.

7. The system of claim 1 further comprising a first exhaust unit adaptively coupled to the plurality of animal breeding units, wherein the first exhaust unit is configured to remove gases produced by the plurality of animals from the plurality of animal breeding units.

8. The system of claim 7, wherein the first exhaust unit is adaptively coupled to the at least one aeroponic unit for delivering at least one gas from the gases produced by the plurality of animals to the at least one aeroponic unit.

9. The system of claim 1, wherein the at least one aeroponic unit is adaptively coupled to a second exhaust unit, wherein the second exhaust unit is configured to remove gases produced by the plurality of plants from the at least one aeroponic unit.

10. The system of claim 9, wherein the second exhaust unit is adaptively coupled to the plurality of animal breeding units for delivering at least one gas from the gases produced by the plurality of plants to the plurality of animal breeding units.

11. The system of claim 1, wherein the processing unit comprises:
    a chemical treatment unit for chemically treating the animal waste;
    a thermal treatment unit for thermally treating the animal waste, wherein the thermal treatment unit utilizes solar energy for thermally treating; and a biological digester for aerobically digesting the animal waste.

12. The system of claim 1 further comprising an environment maintenance unit, wherein the environment maintenance unit comprises:
   a temperature controller configured to control temperature of air within the animal breeding farm;
   a humidity controller configured to control humidity of the air within the animal breeding farm; and
   a light source configured to provide supplementary light energy for the animal breeding farm.

13. The system of claim 1 further comprising at least one rail, wherein the at least one rail is held by at least one rail holder, a waste collection unit of the plurality of waste collection units comprising at least one wheel moveably coupled to the at least one rail.

14. A method of managing animal waste in an animal breeding farm, the animal breeding farm comprising a plurality of animals, the animal breeding farm being sealed from external atmosphere, the method comprising:
   collecting the animal waste from the plurality of animals;
   processing the animal waste for obtaining fertilizers, wherein the processing comprises chemical treatment, thermal treatment, and aerobic digestion of the animal waste; and
   utilizing the fertilizers for growing a plurality of plants in at least one aeroponic unit.

15. The method of claim 14 further comprising supplying solar energy to the at least one of the plurality of animals and the plurality of plants.

16. The method of claim 14, wherein the animal waste comprises at least one of animal excreta, slaughter remains, and animal gases produced by the plurality of animals.

17. The method of claim 14 further comprising spraying a solution to root portions of the plurality of plants, wherein the solution comprises the fertilizers, water and at least one chemical of a set of chemicals.

18. The method of claim 17 further comprising collecting a portion of the solution dropped from the root portions of the plurality of plants.

19. The method of claim 14 further comprising maintaining atmosphere within the animal breeding farm, wherein maintaining the atmosphere comprises controlling temperature of air, controlling humidity of air, and providing supplementary light energy.

20. The method of claim 14 further comprising delivering at least one gas of the gases produced by the plurality of animals to the at least one aeroponic unit.

21. The method of claim 14 further comprising delivering gases produced by the plurality of plants to the plurality of animals.

\* \* \* \* \*